United States Patent

[11] 3,617,776

[72] Inventor Ury Priel
Cupertino, Calif.
[21] Appl. No. 806,981
[22] Filed Mar. 13, 1969
[45] Patented Nov. 2, 1971
[73] Assignee Motorola, Inc.
Franklin Park, Ill.

[54] MASTER SLAVE FLIP-FLOP
18 Claims, 1 Drawing Fig.

[52] U.S. Cl. .......... 307/291, 307/289, 328/206
[51] Int. Cl. .......... H03k 3/12
[50] Field of Search .......... 307/289, 290, 291; 328/206

[56] References Cited
UNITED STATES PATENTS

| | | | |
|---|---|---|---|
| 3,437,840 | 4/1969 | Murray et al. ................ | 307/247 |
| 3,440,449 | 4/1969 | Priel et al. ...................... | 307/291 |

*Primary Examiner*—Donald D. Forrer
*Assistant Examiner*—R. C. Woodbridge
*Attorney*—Mueller & Aichele

ABSTRACT: Disclosed is a master slave flip-flop including two bistable logic stages, each of which includes transistors which are cross-connected to alternately conduct as binary information is applied to the stages. Both logic stages are connected to receive clock signals which enable binary information to be applied to and stored by one of the two logic stages and thereafter shifted into the other stage when the level of clock signals changes.

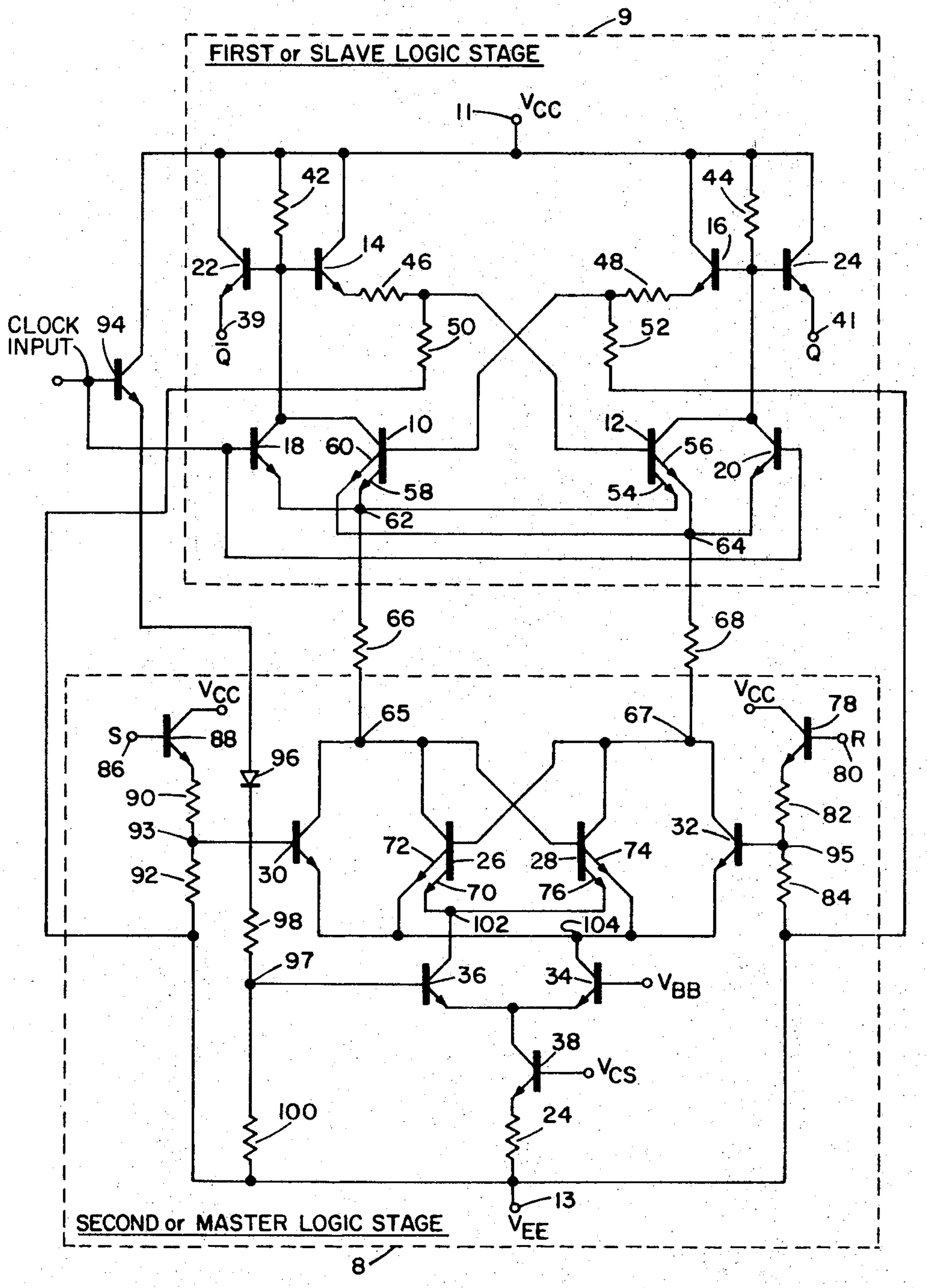
INVENTOR.
Ury Priel
BY
Mueller, Aichele & Rauner
ATTY'S.

MASTER SLAVE FLIP-FLOP

BACKGROUND OF THE INVENTION

This invention relates generally to a master slave bistable element and more particularly to a cascaded current mode flip-flop which is connected herein to operate as a shift register element.

Master slave flip-flop are generally well known and may include, for example, two or more cascaded bistable logic stages connected to receive binary information. In master slave flip-flops having two bistable logic stages, binary data is normally applied to and stored in one of the two logic stages in response to one level of applied clock signals and thereafter shifted into the other logic stage in response to a different level of clock signals.

Prior art current mode logic master slave flip-flops normally require a separate power supply for each stage i.e., one power supply for the master stage and one supply for the slave stage. Thus, these prior art master slave flip-flops require more and operate at slower speeds than other types of digital circuits which operate from a single DC supply. The present invention, however requires only a single DC power supply due to the unique construction in which both the master and the slave portions are vertically cascaded. The current which establishes the logic state in the master stage does the same in the slave stage in a manner that enables the master slave flip-flop to operate at a minimum power level.

SUMMARY OF THE INVENTION

An object of the present invention is to provide a new and improved master slave flip-flop which consumes minimum power during operation.

Another object of the present invention is to provide a master slave flip-flop which is operative at high speeds and which has a greatly improved speed-power product when compared to other known prior art master slave flip-flops.

The present invention features first and second digital logic stages connected in cascade across a single pair of power supply leads and powered by a single supply voltage source.

Another feature of the present invention is the provision of a single, constant current sink for both logic stages of the flip-flop.

Another feature of the present invention is the provision of a pair of current paths between two logic stages of the master slave flip-flop. Current flows alternately in these paths in accordance with the particular binary states of the two logic stages.

A further feature of the present invention is the provision of a new and improved clocked, master slave current mode flip-flop which may be fabricated as a monolithic integrated circuit.

These and other objects and features of this invention will become more fully apparent from the following description of the accompanying drawing.

BRIEF DESCRIPTION OF THE DRAWING

The master slave flip-flop according to the present invention is illustrated in a single schematic diagram in the accompanying drawing.

BRIEF DESCRIPTION OF THE INVENTION

Briefly described, the present invention includes first and second bistable logic stages, each having two binary conductive states. These logic stages are connected in series across a single pair of power supply leads or terminals and have first and second current paths therebetween which alternately conduct current in accordance with the binary conductive state of the two logic stages. Each of the two logic stages is connected to receive clock signals from a single source of clock signals, and the clock signals control the conductive state of the two logic stages. The clock signals cause information which has been previously stored in one of the two logic stages to be shifted into the other of the two logic stages in response to a change in level of clock signals applied to the two logic stages.

DETAILED DESCRIPTION OF THE INVENTION

The inventive master slave flip-flop to be described herein is embodied in an R-S type clocked master slave flip-flop. However, this invention is not limited to the specific master slave flip-flop described below. The present invention may be embodied in many other types of master slave flip-flops which, in accordance with the present invention, are powered from a single pair of power supply leads or terminals, i.e., vertically cascaded across a single power supply.

Identification of Circuit Components

In this section of the specification, the various active and passive circuit components of the master slave flip-flop will be identified. In a subsequent portion of the specification, master slave flip-flop operation will be described.

The master slave flip-flop embodying the present invention includes a first or slave bistable logic stage 9 cascaded to a second or master bistable logic stage 8 across first and second power supply terminals 11 and 13, respectively. The slave portion 9 of the flip-flop includes first and second holding or latch transistors 10 and 12 cross coupled, respectively, to first and second level-shifting transistors 16 and 14. Level-shifting resistors 46 and 48 and power supply resistors 50 and 52 establish the DC operating potentials at the bases of the first and second holding transistors 10 and 12.

The slave portion 9 of the flip-flop further includes first and second pullover transistors 18 and 20 connected with their collector-to-emitter paths in parallel with the first and second holding transistors 10 and 12. Pullover transistors 18 and 20 are controlled by the clock signals at the base terminal of clock input transistor 94, and these clock signals are operative to control the binary state of the slave portion 9 of the flip-flop. First and second output emitter follower transistors 22 and 24 are connected to the common collector nodes of transistors 18 and 10 and transistors 12 and 20, respectively, and provide the $\overline{Q}$ and Q outputs of the flip-flop.

First and second common emitter nodes 62 and 64 in the slave portion 9 of the flip-flop are connected via first and second resistors 66 and 68 to first and second current input nodes 65 and 67 in the master portion 8 of the flip-flop. The master portion 8 includes third and fourth holding or latchback transistors 26 and 28 having their emitter-collector paths connected in parallel with third and fourth pullover transistors 30 and 32, respectively. The third holding transistor 26 and the fourth holding transistor 28 have their respective emitters 70 and 76 connected to a third common emitter node 102; the third and fourth pullover transistors 30 and 32 have their emitters connected to the additional emitters 72 and 74 of the third and fourth holding transistors 26 and 28 at a fourth common emitter node 104. A clocking transistor 36 is also connected to the third common emitter node 102 and a reference transistor 34 is connected to the fourth common emitter node 104. The reference transistor 34 and clocking transistor 36 are emitter coupled to the collector of a current sink transistor 38.

Set and reset transistors 88 and 78 are connected via resistors 90 and 82, respectively, to the bases of the third and fourth pullover transistors 30 and 32, and the clock input transistor 94 is connected via level-shifting diode 96 and resistor 98 to the base node 97 of the clocking transistor 36. The clock input transistor 94 is connected to receive digital clock signals which control the binary state of the master slave flip-flop as will be described in more detail below.

The remaining resistive circuit components not heretofore specifically identified function to establish the current of the current source transistor 38 and resistor 24 and to establish the voltage at the base of transistor 32, resistor 84 and resistor 82.

Operation

Assume for the purpose of explaining the master slave flip-flop operation that the clock signal at the base node of input clock transistor 94 is low and that the state of the master portion 8 of the flip-flop is such that the third holding transistor 26 is conducting and that the second holding transistor 28 is nonconducting. For this condition, collector current for transistor 26 is supplied from the first common emitter node 62 of the slave logic stage 9 and through a first resistor 66 connected between nodes 62 and 65. With the reference resistor 34 now overriding the clocking transistor 36, there will be no emitter current flowing from emitter 70 of the third holding transistor 26, and all of the emitter current from the third holding transistor 26 will flow from emitter 72, through the fourth common emitter node 104 and into the collector of the reference transistor 34.

Current is supplied to the first common emitter node 62 from three different emitters during different periods of master slave flip-flop operation. However, for the condition described above where the clock is low and where the third holding transistor 26 is conducting, assume that the first holding transistor 10 supplies current to the first common emitter node 62 via its emitter 58. With the first holding transistor 10 conducting its collector current through a first logic resistor 42, the base of the emitter follower 22 will be lower than the base of emitter follower 24; thus the $\overline{Q}$ output at output terminal 39 will be low or at a logical zero level (using positive logic) and the Q output at terminal 41 will be high or at a logical one level. With the clock signals at the base node of the clock input transistor 94 low, the slave logic stage 9 has its conductive state fixed, and set and reset information S and R applied to the second or master logic stage 8 will have no affect on the conductive state of the first or slave logic stage 9. Note that the current is now flowing in resistors 42 and 66.

Suppose that it is now desired to apply set and reset binary information to the master logic stage 8 to change the conductive state thereof. If a set signal S is applied at the base node 86 of the set input transistor 88, the third pullover transistor 30 will be biased into conduction and will override the third holding transistor 26. However, the collector current for the third pullover transistor 30 will be supplied from the first common emitter node 62 and through the first resistor 66 into the first current input node 65, not affecting the existing current path in the first or slave logic stage 9. Thus, when a set signal is applied to the master logic stage 8 when the latter is in its "set" state, the set signal has no affect on the master logic stage 8. If the clock signal changes state to a logical "1," the current path in the slave stage 9 will not change either and the master slave flip-flop will store a "1" as before.

Suppose now that it is desired to reset the master portion 8 of the flip-flop by applying a high logic signal to the base node 80 of the reset transistor 78 when the clock is still low. This signal will turn on the reset transistor 78 and be coupled via resistor 82 into the base of the fourth pullover transistor 32. When the fourth pullover transistor 32 turns on, it will override the emitter 72 of the previously conducting third holding transistor 26 which is differentially coupled to the fourth pullover transistor 32 at node 104. Now when the fourth pullover transistor 32 turns on, its collector current is supplied from the second common emitter node 64 via second resistor 68 into a second current input node 67. When the fourth pullover transistor 32 is biased into conduction, the first holding transistor 10 in the slave logic stage 9 must supply its current through emitter 60 rather than emitter 58 and into the second common emitter node 64. Note that during the above-described operation there is no change in the conductive state of the first and second holding transistors 10 and 12. Holding transistor 10 remains conducting and holding transistor 12 remains nonconducting as long as the clock is low; the only change in current conduction is that of emitters 58 and 60 previously described. Thus far, only the master portion of the mater slave flip-flop has been reset.

Suppose now that the reset signal R is removed from the base node 80 of the reset transistor 78. When this happens, the fourth holding transistor 28 will now "take over" from the fourth pullover transistor 32, since the base potential of transistor 32 is higher than that of transistor 26 due to the voltage drop in resistor 68. Collector current for transistor 28 will now be supplied from the second current output node 64 and through a second resistor 68. Thus, the conductive state of the master logic stage has changed from a condition where transistor 26 was originally conducting and transistor 28 was originally nonconducting to the reverse of this condition where transistor 28 is now conducting and transistor 26 is nonconducting. However, as long as the clock signal remains low, this shift of information into the second or master logic stage 8 does not affect the conductive state of the first or slave logic stage 9.

Suppose now that it is desired to shift this information which has just been applied to the master logic stage 8 into the slave logic 9. This shift is performed immediately when the clock signal at the base node of the clock input transistors 94, 18 and 20 rises high to a binary one logical level. When the latter happens, the clock signal which is translated by level shifting diode 96 and resistor 98 and applied to the base node 97 overrides the reference potential $V_{BB}$. Clocking transistor 36 now conducts current from the third common emitter node 102 and from emitter 76 of the fourth holding transistor 28. Thus, emitter 76 "takes over" from emitter 74, but there is no further change in the conductive state of the third and fourth holding transistors 26 and 28, respectively.

When the clock signal swings high and is applied to the bases of the first and second pullover transistors 18 and 20, one of these pullover transistors 18 and 20 will conduct depending upon the node 62 or 64 through which the slave logic stage 9 is supplying current to the master logic stage 8. For the condition described above, current is flowing from the second common emitter node 64 and supplied by the emitter 60 of the first holding transistor 10. For such condition and when the clock signal goes high, the second pullover transistor 20 will override the first holding transistor 10 and conduct its collector current from the second logic resistor 44 in the slave logic stage 9. When current flows through the second logic resistor 44, the base potential of the second emitter follower 16 drops and this negative transition is coupled via resistor 48 into the base of the first holding transistor 10 to maintain transistor 10 nonconducting once the clock signal swings low again. As the first holding transistor 10 turns off, the base potential of the first emitter follower 14 will rise. This positive going transition will be coupled through level shifting resistor 46 and into the base of the second holding transistor 12 to maintain transistor 12 conducting once the clock swings low again. Thus, the rise and subsequent fall of the clock signals after the conductive state of the master logic stage 8 has been changed has the effect of overriding the previously conducting holding transistor 10 or 12 in the slave logic stage 9. The previously conducting holding transistor 10 is driven to nonconduction and the previously nonconducting holding transistor 12 is biased into conduction. With second holding transistor 12 now conducting, the Q output at terminal 39 swings high to a binary one logical level and the Q output at output terminal 41 swings low to a binary zero logical level.

When the clock was low at a logical "0" and Q was also at the logic "0," the logic generating current was flowing in resistors 42 and 66. When reset signal R was raised to a logical "1," the current path was changed to a resistors 42 and 68, and when the clock was changed to a logical "1" the current path was changed again to resistors 44 and 68. The reset signal was thus shifted to the slave potion of the master flip-flop.

By an operation similar to the above-described operation, a positive going set signal may now be applied to the master logic stage 8 when the clock signal is low to cause the third pullover transistor 30 to override the fourth holding transistor 28, biasing the third holding transistor 26 to conduction and biasing the fourth holding transistor 28 to nonconduction once the clock signal swings low again. After this action of setting the master logic stage 8, and the clock signal still low, the second holding transistor 12 will continue to conduct. Emitter 54 will now conduct current to the first common emitter node 62 ans supply collector current to the third holding transistor 26 through the first current input node 65. If the clock signal swings high again, the first pullover transistor 18 will override the second holding transistor 12 and conduct its collector current through the first logic resistor 42. This latter action will have the affect of dropping the base potential of the second holding transistor 12 to a value insufficient to maintain the second holding transistor 12 conducting when the clock signal again swings low. As transistor 12 turns off, the base potential of the second emitter follower transistor 16 rises and such rise in potential is coupled into the base of the first holding transistor 10 to bias transistor 10 into conduction once the clock swings low again. Thus, with transistor 10 again conducting and transistor 12 nonconducting, the slave logic stage 9 has been reverted to its original assumed conductive state where the $\overline{Q}$ output at output terminal 39 is at a low logical level and the Q output at the output terminal 41 is at a high logical level.

The level-shifting diode 96 and the level-shifting resistors 98 and 100 are selected to provide a clock level at the base node 97 compatible with the reference level $V_{BB}$ at the base of the reference 34. The clock level at the base node 97 must be shifted to a lower level than the level applied to the bases of the first and second pullover transistors 18 and 20. This is due to the fact that the DC biasing levels in the master portion 8 of the flip-flop must be lower than the DC biasing levels in the slave portion of the flip-flop 9 in order to prevent a "race" condition from occuring. The voltage divider resistors 90 and 92 in the emitter circuit of the set transistor 88 are selected to provide a desired DC voltage threshold at the base of the third pullover transistor 30. Similarly, the voltage divider resistors 82 and 84 in the emitter circuit of reset transistor 78 are selected to provide a desired DC bias potential at the base of the fourth pullover transistor 32.

Listed in the table below are voltage and resistance values used in a circuit of the type described above which has been built and successfully operated.

TABLE

| Component | Value |
|---|---|
| Resistor (R) | 24 = 200 ohms |
| | 42 = 270 ohms |
| | 44 = 270 ohms |
| | 46 = 150 ohms |
| | 48 = 150 ohms |
| | 50 = 2 k ohms |
| | 52 = 2 k ohms |
| | 66 = 30 ohms |
| | 68 = 30 ohms |
| | 82 = 300 ohms |
| | 84 = 1.85 k ohms |
| | 90 = 300 ohms |
| | 92 = 1.85 k ohms |
| | 98 = 100 ohms |
| | 100 = 2 k ohms |
| $V_{BB}$ | = −2.68 v. |
| $V_{CS}$ | = −3.92 v. |
| $V_{EE}$ | = −5.2 v. |
| $V_{CC}$ | = 0 v. |
| logical "1" | = −0.7 v. |
| logical "0" | = −1.55 v. |

The above table should not be construed as limiting the scope of the present invention; the invention described above may be practiced other than as specifically described. For example, the disclosed master slave flip-flop circuitry may be readily converted to a "divide by two" circuit, a JK flip-flop, a "D" or delay type flip-flop or various other memory and counting elements. This type of conversion may me made through minor modifications in the disclosed circuit as is apparent to those skilled in the art. However, in each of these modified circuits the first and second interstage coupling resistors 66 and 68 will be used. Accordingly, said invention is limited only by way of the following appended claims.

I claim:

1. A master slave flip-flop including in combination:

a. a first, bistable logic stage having first and second current output nodes and conducting current from one of said first and second current output nodes in accordance with the binary state of said first logic stage, b. a second, bistable logic stage having third and fourth current output nodes and conducting current from one of said third and fourth current output nodes in accordance with the binary state of said second logic stage, c. conductive means DC coupling said first and second current output nodes of said first logic stage to said second logic stage to thereby serially connect said first and second logic stages, d. a first power supply terminal connected to said first logic stage, and e. a second power supply terminal connected to said second logic stage, whereby said first and second logic stages may be powered by a single power supply adapted for connection to said first and second power supply terminals, one of said stages including a single means coupled between said one stage and the terminal of said power supply to which said one stage is connected, said single means generating current for both of said flip-flop stages such that one power supply drives the two cascaded logic stages, whereby the use of a single current generating means for said cascaded stages reduces the current necessary to drive said flip-flop stages at a given frequency by one-half that necessary when said stages are driven in parallel by two current generating means.

2. The master slave flip-flop defined in claim 1 which further includes clocking means coupled to said first and second logic stages and enabling said first logic stage for a change of state when clock signals applied thereto are at one level and enabling said second logic stage for a change of state when clock signals applied thereto are at another level.

3. The master slave flip-flop defined in claim 2 wherein said conductive means DC coupling said first logic stage to said second logic stage comprises first and second resistors connecting said first and second current output nodes, respectively, to first and second current input nodes of said second logic stage.

4. The master slave flip-flop defined in claim 3 wherein said first logic stage includes:

a. a first holding transistor differentially connected to a first pullover transistor at said first current output node and differentially connected to a second pullover transistor at said second current output node, and b. a second holding transistor differentially connected to said first pullover transistor and said first holding transistor at first current output node and differentially connected to said second pullover transistor at said second current output node, whereby said first and second pullover transistors are adapted to receive clock signals capable of overriding said first and second holding transistors to change the conductive state of said first logic stage; said first and second holding transistors operative to supply current to either one of said first and second current output nodes without changing the conductive state of the first logic stage.

5. The master slave flip-flop defined in claim 4 wherein said second logic stage includes:

a. a third holding transistor differentially connected to third and fourth pullover transistors at said fourth current output node, and b. a fourth holding transistor differentially connected to said third and fourth pullover transistors at said fourth current output node and differentially connected to said third holding transistor at said third current output node, said third and fourth pullover transistors adapted to receive set and reset signals capable of overriding said third and fourth holding transistors to change the conductive state of said second logic stage when said second logic stage is enabled by clock signals at a predetermined level; said third and fourth holding transistors operative to supply current to either one of said third or fourth current output modes without changing the conductive state of said second logic stage.

6. The master slave flip-flop defined in claim 5 wherein said second logic stage further includes:

a. a reference transistor connected to said third and fourth holding transistors and to said third and fourth pullover transistors at said fourth current output node, and b. a clocking transistor differentially connected to said reference transistor and further connected to said third and fourth holding transistors at said third current output node, whereby when clock signal coupled to said clocking transistor override the reference potential on said reference transistor, said second logic stage is maintained in a fixed conductive state, said second logic stage being enabled for a change of state when said reference potential on said reference transistor overrides the potential on said clocking transistor, the set and reset information applied to said second logic stage when said reference potential is overriding the potential on said clocking transistor being shifted into said first logic stage when the clock signal changes levels and overrides the potentials on one of the first and second holding transistors in said first logic stage.

7. Master slave flip-flop including in combination:

a. a slave flip-flop portion having first and second common emitter nodes and conducting current from one of said first and second common emitter nodes in accordance with the binary state of said slave flip-flop portion, b. a master flip-flop portion having and fourth common emitter nodes and conducting current from one of said third and fourth common emitter nodes in accordance with the binary state of said master flip-flop portion, c. conductive means DC coupling said first and second emitter nodes of said slave flip-flop portion to said master flip-flop portion to thereby serially connect said master flip-flop portion to said slave flip-flop portion, and d. a power supply having first and second terminals, said first and second flip-flop portions being vertically cascaded across said first and second terminals such that said flip-flop portions are connected in series across said power supply.

8. The master slave flip-flop defined in claim 7 which further includes clocking means coupled to said master and slave flip-flop portions and enabling said slave flip-flop portion for a change of state when clock signals applied thereto are at one logical level and enabling said master flip-flop portion for a change of state when signals applied thereto are at another logical level.

9. The master slave flip-flop defined in claim 8 wherein said conductive means DC coupling said slave flip-flop portion to said master flip-flop portion comprises first and second resistors connecting said first and second common emitter nodes, respectively, to first and second current input nodes of said master flip-flop portion.

10. The master slave flip-flop defined in claim 8 wherein said slave flip-flop portion includes:

a. a first holding transistor differentially connected to a first pullover transistor and to a second holding transistor at said first current output node, and b. said second holding transistor differentially connected to a second pullover transistor and to said first holding transistor at said second common emitter node, whereby said first and second pullover transistors are adapted to receive clock signals capable of overriding said first and second holding transistors to change the conductive state of the slave portion of the master slave flip-flop.

11. The master slave flip-flop defined in claim 10 wherein said master flip-flop portion includes:

a. a third holding transistor differentially connected to third and fourth pullover transistors at said fourth common emitter node, b. a forth holding transistor differentially connected to said third and fourth pullover transistors at said fourth common emitter node and differentially connected to said third holding transistor at said third common emitter node, whereby said third and fourth pullover transistors are adapted to receive set and reset signals capable of overriding said third and fourth holding transistors to change the conductive state of the master portion of the flip-flop when said master portion of the flip-flop is enabled by clock signals applied thereto.

12. The master slave flip-flop defined in claim 11 which further includes:

a. a reference transistor connected to said third and fourth holding transistors and to said third and fourth pullover transistors at said fourth common emitter node, and b. a clocking transistor differentially connected to said reference transistor and further connected to said third and fourth holding transistors at said third common emitter node, whereby when clock signals coupled to said clocking transistor override the reference potential on said reference transistor, said master flip-flop portion is maintained in a fixed conductive state, said master flip-flop portion being enabled for a change of state when said reference potential on said reference transistor overrides the potential on said clocking transistor.

13. The master slave flip-flop defined in claim 12 wherein:

a. said first and second holding transistors each have a pair of emitters connected, respectively, to said first and second common emitter nodes to thereby supply current to either of said first or second common emitter nodes, and b. said third and fourth holding transistors each have a pair of emitters connected, respectively, to said third and fourth common emitter nodes to thereby supply current to either said reference transistor or to said third clocking transistor.

14. The master slave flip-flop defined in claim 13 wherein: transistors at emitter a. said first pullover transistor is emitter coupled to both said first and second holding transistors at said first common emitter node, and b. said second pullover transistor is emitter coupled to both said first and second holding transistors at said second common emitter node, whereby said first and second pullover transistors are operative to override one of said first or second holding transistors when clock signals applied to said first and second pullover transistors reach a predetermined logical level.

15. The master slave flip-flop defined in claim 14 wherein:

a. said third pullover transistor is emitter coupled to both said third and fourth holding transistors at said fourth common emitter node, and b. said fourth pullover transistor is emitter coupled to both said third and fourth holding transistors at said fourth common emitter node, whereby the set and reset signals coupled to said third and fourth pullover transistors, respectively, are operative to override either said third or said fourth holding transistor and change the conductive state of the master portion of the flip-flop.

16. The master slave flip-flop defined in claim 15 which further includes:

a. first and second level shifting transistors connected, respectively, between said first and second holding transistors and said first power supply terminal for establishing the DC operating levels at said first and second holding transistors, b. first and second output transistors connected, respectively, to said first and second level shifting transistors for providing digital output signals from said master slave flip-flop, and c. a current sink transistor connected between a common output node of said reference and said clocking transistor and said second power supply terminal for conducting a substantially constant current from said master slave flip-flop during the operation thereof.

17. The master slave flip-flop defined in claim 16 which further includes set and reset transistors connected respectively between set and rest input terminals and said third and fourth pullover transistors for providing set and reset signals to said master flip-flop portion.

18. A master slave flip-flop adapted to be coupled to a single power supply having first and second terminals, including in combination:

a. a first, bistable logic stage during first and second current output nodes and conducting current from one of said first and second current output nodes in accordance with the binary state of said first logic stage, b. a second, bistable logic stage having third and fourth current output nodes and conducting current from one of said third and fourth current output nodes in accordance with the binary state of said second logic stage, and c. conductive means DC coupling said first and second current output nodes of said first logic stage to said second logic stage to thereby serially connect said first and second logic stages, said first and second bistable logic stages being vertically cascaded such that such stage are adapted to be connected in series across the first and second terminals of said power supply.

* * * * *